US009844062B2

(12) United States Patent
Yang et al.

(10) Patent No.: US 9,844,062 B2
(45) Date of Patent: Dec. 12, 2017

(54) APPARATUS AND METHOD FOR CONFIGURING RELAY CHANNEL OF MOBILE DEVICE

(71) Applicant: HISENSE MOBILE COMMUNICATIONS TECHNOLOGY CO., LTD., Qingdao (CN)

(72) Inventors: Chuanqing Yang, Qingdao (CN); Zizhi Sun, Qingdao (CN); Bin Zheng, Qingdao (CN); Shidong Shang, Qingdao (CN); Changsheng Zhou, Qingdao (CN)

(73) Assignees: HISENSE MOBILE COMMUNICATIONS TECHNOLOGY CO., LTD., Qingdao (CN); HISENSE USA CORPORATION, Suwanee, GA (US); HISENSE INTERNATIONAL CO., LTD., Qingdao (CN)

( * ) Notice: Subject to any disclaimer, the term of this patent is extended or adjusted under 35 U.S.C. 154(b) by 12 days.

(21) Appl. No.: 15/061,335

(22) Filed: Mar. 4, 2016

(65) Prior Publication Data
US 2017/0094670 A1   Mar. 30, 2017

(30) Foreign Application Priority Data
Sep. 30, 2015   (CN) .......................... 2015 1 0644891

(51) Int. Cl.
*H04W 72/00*   (2009.01)
*H04W 72/08*   (2009.01)
(Continued)

(52) U.S. Cl.
CPC ........... *H04W 72/082* (2013.01); *H04W 4/06* (2013.01); *H04W 76/023* (2013.01)

(58) Field of Classification Search
CPC ..... H04W 24/00; H04W 84/18; H04W 16/12; H04W 80/04; H04W 84/12; H04L 1/0026; H04L 2012/5607
(Continued)

(56) References Cited

U.S. PATENT DOCUMENTS

| 8,958,338 | B2 * | 2/2015 | Laursen | ........................ 370/254 |
| 9,320,044 | B2 * | 4/2016 | Xu | ...................... H04W 72/082 |

(Continued)

*Primary Examiner* — Steve D Agosta
(74) *Attorney, Agent, or Firm* — Harness, Dickey & Pierce, P.L.C.

(57) ABSTRACT

Embodiments of the present application provide an apparatus for configuring a relay channel of a mobile device, the apparatus including: a wireless access node connecting module configured to access to an external wireless access point through a station node of Wi-Fi inbuilt in the mobile device; a node channel inquiring module configured to inquire about a first channel over which the wireless access point operates; a relay channel calculating module configured to calculate a second channel without interference from and to the first channel; and a relay instruction sending module configured to send a relay instruction to an inbuilt Wi-Fi module through a P2P (Peer-to-Peer) node of Wi-Fi inbuilt in the mobile device so that logon information of the mobile device is broadcasted over the second channel, and one or more external electronic devices access to the mobile device through the inbuilt P2P node over the second channel.

8 Claims, 5 Drawing Sheets

(51) Int. Cl.
*H04W 4/06* (2009.01)
*H04W 76/02* (2009.01)

(58) Field of Classification Search
USPC .............. 455/41.2, 41.3, 452.2, 63.1, 67.13;
370/310.2, 328, 338
See application file for complete search history.

(56) References Cited

U.S. PATENT DOCUMENTS

| | | | |
|---|---|---|---|
| 2009/0232047 A1* | 9/2009 | Lynch, Jr. ............. | H04W 84/22 370/328 |
| 2011/0103428 A1* | 5/2011 | Chan .................... | H04W 16/14 375/133 |
| 2012/0003932 A1* | 1/2012 | Zhodzishsky ..... | H04W 52/0229 455/41.2 |
| 2012/0063369 A1* | 3/2012 | Lin .................... | H04B 7/15542 370/279 |
| 2013/0203432 A1* | 8/2013 | Wang ................. | H04W 72/082 455/452.1 |
| 2015/0019432 A1* | 1/2015 | Burns ................ | G06Q 20/3278 705/44 |
| 2015/0023336 A1* | 1/2015 | Ilsar .................... | H04W 48/20 370/338 |

* cited by examiner

APPARATUS AND METHOD FOR CONFIGURING RELAY CHANNEL OF MOBILE DEVICE

CROSS-REFERENCE TO RELATED APPLICATION

This application claims the benefit and priority of Chinese Patent Application No. 201510644891.9 filed Sep. 30, 2015. The entire disclosure of the above application is incorporated herein by reference.

FIELD

The present disclosure relates to the field of mobile communications.

BACKGROUND

This section provides background information related to the present disclosure which is not necessarily prior art.

Wireless signals, e.g., Wireless Fidelity (Wi-Fi), have been widely applied to the various aspects of our life due to convenience and expeditiousness of wireless communication.

The strength and coverage area of the wireless signals in wireless communication have been significant factors bothering users.

For example, if a router is placed in a sitting room, and a handset is placed in a bedroom, then there will be such a poor Wi-Fi signal that an access to the Internet may not be stable.

In another example, the searching handset locates a Wi-Fi signal outdoors, but the signal is so weak that an access indoors to the Internet may not be stable, and the signal can enable the access to the Internet only in a balcony or out of a window.

In a further example, the area of the a room is larger than the coverage area of the signal, so if the user holding his or her handset is walking in the larger room, then a blind spot of the signal may frequently occur in the room, thus interrupting the access to the Internet, etc.

SUMMARY

This section provides and general summary of the disclosure, and is not a comprehensive disclosure of its full scope or all of its features.

An embodiment of the present application discloses an apparatus for configuring a relay channel of a mobile device, applicable to the mobile device, the apparatus including:
 a wireless access node connecting module configured to access to an external wireless access point through a station node of Wi-Fi inbuilt in the mobile device;
 a node channel inquiring module configured to inquire about a first channel over which the wireless access point operates;
 a relay channel calculating module configured to calculate a second channel without interference from and to the first channel; and
 a relay instruction sending module configured to send a relay instruction to an inbuilt Wi-Fi module through a P2P (Peer-to-Peer) node of Wi-Fi inbuilt in the mobile device so that logon information of the mobile device is broadcasted over the second channel, and one or more external electronic devices access to the mobile device through the inbuilt P2P node over the second channel.

An embodiment of the present application further discloses an apparatus for configuring a relay channel of a mobile device, applicable to the mobile device, the apparatus including:
 a processor; and
 a memory storing at least one instruction configured to be executed by the processor:
 to access to an external wireless access point through a station node of Wi-Fi inbuilt in the mobile device;
 to inquire about a first channel over which the wireless access point operates;
 to calculate a second channel without interference from and to the first channel; and
 to send a relay instruction to an inbuilt Wi-Fi module through a P2P node of Wi-Fi inbuilt in the mobile device, so that logon information of the mobile device is broadcasted over the second channel, and one or more external electronic devices access to the mobile device through the P2P node over the second channel.

An embodiment of the present application further discloses a method for configuring a relay channel of a mobile device, the method including:
 accessing, by the mobile device, to an external wireless access point through a station node of Wi-Fi inbuilt in the mobile device;
 inquiring, by the mobile device, about a first channel over which the wireless access point operates;
 calculating, by the mobile device, a second channel without interference from and to the first channel; and
 sending, by a P2P (Peer-to-Peer) node of Wi-Fi inbuilt in the mobile device, a relay instruction to an inbuilt Wi-Fi module inbuilt in the mobile device, so that logon information of the mobile device is broadcasted over the second channel, and one or more external electronic devices access to the mobile device through the inbuilt P2P node over the second channel.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

Figure 1:
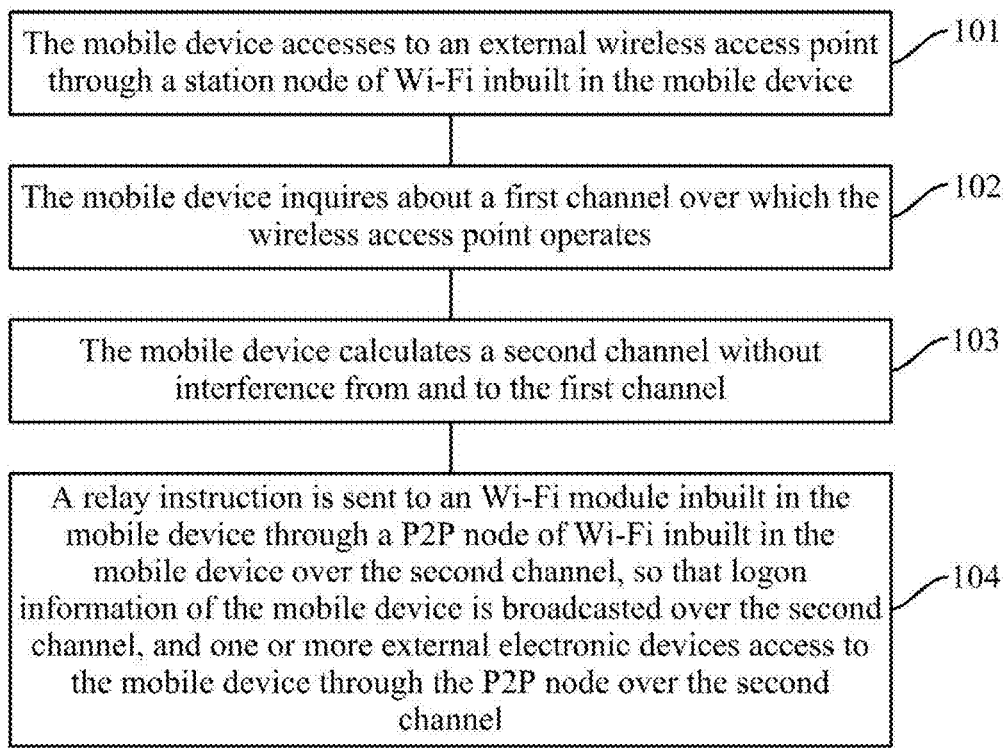
FIG. 1 is a flow chart of a process of an embodiment of a method for configuring a relay channel of a mobile device according to the present application.

Referring to FIG. 1, there is illustrated a flow chart of a process of a method for configuring a relay channel of a mobile device according to an embodiment of the present application, where the method can include the following steps:

In the step 101, the mobile device accesses to an external wireless access point through a station node of Wi-Fi inbuilt in the mobile device;

It shall be noted that the method according to the embodiment of the present application can be applicable to an operating system of the mobile device, e.g., a handset, a tablet computer, a smart wearable device (e.g., a smart watch), etc.

These mobile devices generally support Windows Phone, Android, IOS, Windows, and other operating systems, and typically can access the wireless Access Point (AP), e.g., a router or an AP-enabled terminal, through Wi-Fi function.

Figure 2:
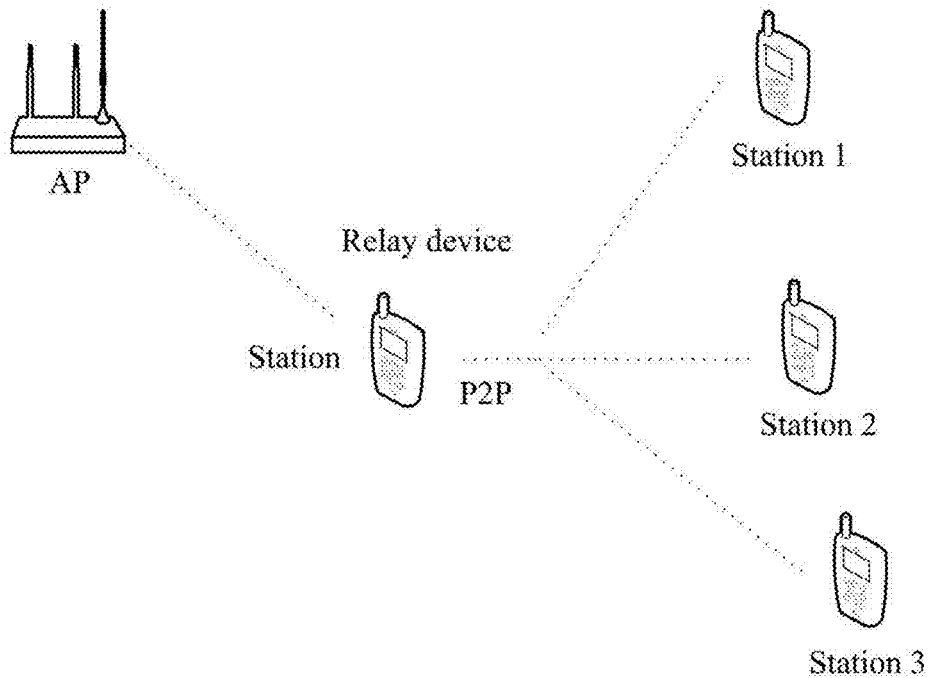
FIG. 2 is a topology diagram of a relay system according to the present application.

As illustrated in FIG. 2, the AP is such a specific node in a wireless network that can access a base station, and through which another type of node in the wireless network can communicate with another device outside or inside the wireless network.

Wi-Fi inbuilt in the mobile device typically functions as a station node or a soft AP node, or a P2P, Peer-to-Peer, node.

Particularly the station node refers to such a device accessing the wireless network that can communicate with another device inside or outside the wireless network through a wireless access point.

The soft AP node refers to the mobile device functioning as a wireless access point so that the soft AP-enabled mobile device can act as a router enabling an access of another station to the wireless network.

The P2P node, also referred to as Wi-Fi Direct, can enable two Wi-Fi devices to be connected directly with and to communicate with each other without any wireless access point.

In the embodiment of the present application, whether a station node has accessed a wireless access point can be determined by invoking the getWifiState( ) function in WifiManager to determine whether the mobile device is enabled as a Wi-Fi station node.

If a station node being started is detected, then the API interface getNetworkInfo( ) available from ConnectivityManager can be invoked by inputting ConnectivityManager.TYPE_WIFI as a parameter thereto to determine whether the station node is connected to a wireless access point.

If the returned NetworkInfo object is not Null, and is Connected( ) is true, then it will be determined that the station node is connected to an external wireless access point.

If it is determined that the station node has accessed to a wireless access point, then it will be determined that the mobile device has accessed to the wireless access point.

If it is determined that no station node is started or the station node has not accessed to any external wireless access point, then an instruction will be generated that Connect to a Wireless Access Point, e.g., "Enable Wi-Fi and access to a router".

In the step 102, the mobile device inquires about a first channel over which the wireless access point operates.

In the Android system, WifiService is responsible for core services of the WiFi function, and particularly the WiFiStateMachine sub-system is responsible for maintaining various state information of WiFi.

The state information includes channel information of the wireless access point, so the first channel with which the station node accessing to the external of the AP can be obtained by invoking the mWifiStateMachine.fetchFrequencyNative( ) function of the system.

In the step 103, the mobile device calculates a second channel without interference from and to the first channel;

As per the electromagnetic interference theory, an electromagnetic wave of any other device than the present device is an interference source emitting electromagnetic energy which can be transmitted to a sensitive device through some propagation pathway so that the sensitive device further responds somehow to the interference, thus resulting in an interference effect.

In the embodiment of the present application, two Wi-Fi antennas in the mobile device are spaced close to each other, and the most significant interference arises from its own antenna to antenna radioactive electromagnetic coupling, and may result in a poor data forwarding capacity and degraded relay performance.

If a signal source is spaced closer to an interference frequency, and there more coupling between them, then there will be higher interference, so in order to lower electromagnetic interference, the second channel can be selected in a range of frequencies without interference from and to the first channel which is a signal source to thereby address the poor data forwarding capacity and degraded relay performance of the relay function due to the channel interference caused by the channel setting.

In an embodiment of the present application, the step 103 can include the following sub-steps:

The sub-step S11 is to inquire about a band type of the first channel; and

The sub-step S12 is to calculate the second channel without interference from and to the first channel according to the band type.

In an embodiment, an AP operates in different bands generally including the 2.4G band (2.412 GHz-2.484 GHz) and the 5G band (5.735 GHz-5.835 GHz).

Here the majority of wireless access points generally operate in the 2.4 GHz band using the wireless technologies as per the (fourth-generation) 802.11n standard, and in the higher 5 GHz band using the fifth-generation Wi-Fi technologies as per the 802.11ac protocol standard.

Figure 3:
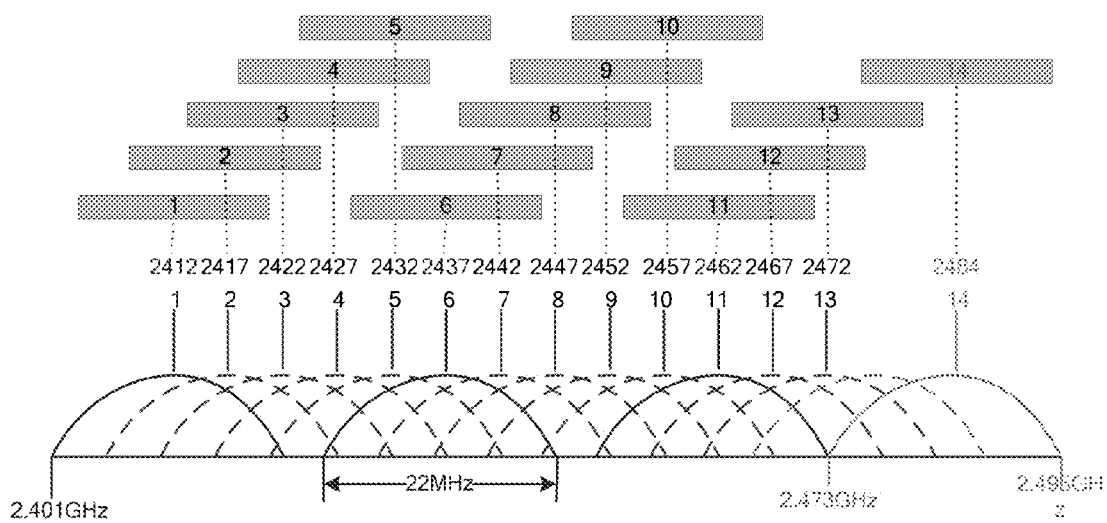
FIG. 3 is a schematic diagram of distributed 2.4G channels.

As illustrated in FIG. 3, the spectrum of the channels 1 to 14 in the 2.4G band is a gradient matrix, and from the perspective of their bands, these channels are divided into three separate bands in total, each of which spans 22 MHz; and since there are identical frequencies overlapping between the adjacent bands, the channels in the respective separate bands interfere with each other, where the particular bands are as follows:

Zone 1: Channels 1 to 5
Zone 2: Channels 6 to 10
Zone 3: Channels 11 to 14

For examples, the frequencies 2406 to 2423 MHz are common to the channel 1 and the channel 2, and at this time, if the first channel of the station node is set to the channel 1, and the second channel of the relay device is set to the channel 2, then there will be an interval in which the frequencies are common, thus resulting in interference.

From the perspective of isolating the bands, there are five isolation intervals in total, and the channels in the isolation intervals do not interfere with each other, where the particular intervals are as follows:

Class 1: 1, 6, 11
Class 2: 2, 7, 12
Class 3: 3, 8, 13
Class 4: 4, 9
Class: 5, 5, 10

Thus if the band type is the 2.4G band, then the second channel can be the first channel shifted by at least 5 channels.

If X represents the first channel of the wireless access point, and Y represents the second channel of the mobile device which is a relay device, then both of them will satisfy the following relationship:

$$Y \geq X+5 \text{ or } Y \leq X-5;$$

Where X and Y are positive integers, and if Y<1 or Y>13, then Y will be invalidated and rejected.

Furthermore the second channel which is the first channel shifted by at least 5 channels is a secured channel but may not necessarily be an optimum channel.

In order to lower electromagnetic interference as much as possible, the optimum channel serial number of the second channel can be selected in a range of frequency the furthest from the first channel which is the band of a signal source.

If the serial number of the first channel is more than or equal to a preset first serial number, then the second channel will be set to a channel with the lowest serial number in the 2.4G band, where the channel with the lowest serial number is spaced from the channel with the first number by at least 6 channels;

If X represents the first channel of the wireless access point, and Y represents the second channel of the mobile device which is a relay device, then both of them will satisfy the following relationship:

If X≥7, then Y=1 is configured, where X and Y are positive integers.

If the serial number of the first channel is less than the preset first serial number, then the second channel will be set to a channel with the highest serial number in the 2.4G band, where the channel with the highest serial number is spaced from the channel with the first number by at least 7 channels;

If X represents the first channel of the wireless access point, and Y represents the second channel of the relay device (i.e. the mobile device), then both of them will satisfy the following relationship:

If X<7, then Y=13 is configured, where X and Y are positive integers.

Figure 4:
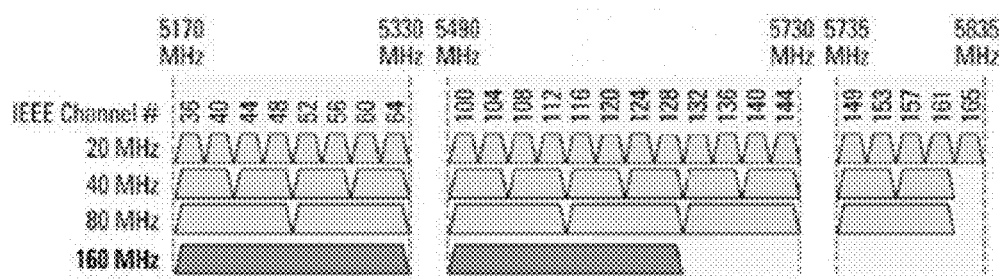
FIG. 4 is a schematic diagram of distributed 5G channels.

As illustrated in FIG. 4, since there are no overlapping frequencies between the channels in the 5G band, the second channel is not the same as the first channel, so that interference can be substantially avoided.

If the band type is the 5G band, then the second channel can be another channel than the first channel.

In order to further obtain an optimum channel, it can be determined whether the serial number of the first channel is less than or equal to a preset second serial number;

If so, then the second channel will be set to a channel with the highest serial number in the 5G band, where the channel with the highest serial number is spaced from the channel with the second number by at least 8 channels;

Otherwise, the second channel will be set to a channel with the lowest serial number in the 5G band, where the channel with the lowest serial number is spaced from the channel with the second number by at least 9 channels.

If X represents the first channel of the AP and Y represents the second channel of the mobile device which is a relay device, then both of them will satisfy the following relationship:

If X≤157, then Y=165 is configured, and if X>157, then Y=149 is configured, where X and Y are positive integers.

In the step 104, a relay instruction is sent to an inbuilt Wi-Fi module through a P2P node of Wi-Fi inbuilt in the mobile device over the second channel, so that logon information of the mobile device is broadcasted over the second channel, and one or more external electronic devices access to the mobile device through the P2P node over the second channel.

As illustrated in FIG. 2, if the mobile terminal has accessed to an active wireless access point, then the P2P node of inbuilt Wi-Fi can send the relay instruction to the inbuilt Wi-Fi module to enable Wi-Fi relaying.

Here the Wi-Fi module, also referred as a serial interface Wi-Fi module, at the transport layer of the Internet of Things can be an embedded module, an inbuilt wireless network protocol IEEE 802.11b.g.n protocol stack, and a TCP/IP protocol stack, configured to convert a serial interface or TTL level in compliance with a Wi-Fi wireless network communication standard.

A hardware device in which the Wi-Fi module is embedded can access the Internet directly using Wi-Fi, which is an important component to enable wireless intelligent home, Machine to Machine (M2M), and other Internet of Things applications.

The logon information for logging into the mobile device can be obtained, where the logon information includes a Service Set Identifier (SSID) and a password;

A first length of the SSID, and a second length of the password are calculated;

The second channel, the SSID, the first length, the password, and the second length are encapsulated in the relay instruction; and The relay instruction is sent in a group mode of the P2P node of inbuilt Wi-Fi to broadcast the SSID at the first length over the second channel, where in the group mode of P2P, a plurality of Wi-Fi devices communicate with each other by enabling their P2P functions, without any wireless access point, to thereby constitute a network which is a P2P network in which the devices can only communicate inside the network, and these communicating devices constitute a P2P group.

The user is asked in a User Interface (UI) to enter an SSID and a password of the relay device (i.e., the mobile device).

If the user enters the SSID and the password in the UI, then the SSID and the password will be applied; otherwise, a default SSID and a default password will be applied.

The first length of the SSID, and the second length of the password are calculated for the relay instruction to be sent.

There are two existing P2P modes including a P2P group mod and P2P client mode.

The P2P group mode is as described above.

Before a P2P group is created, all the smart terminals are respective P2P devices.

After these P2P devices negotiate about P2P, one of the devices will play the role of a Group Owner (GO) (i.e., acts as an AP), and the other devices will play the role of clients, that is, the other devices operate in the P2P client mode.

The original P2P group function is:
p2p_ctrl_group_add(struct_wpa_supplicant*wpa_s, char*cmd)

In this P2P group function, none of the channel, the SSID, the password, and the other parameters can be transmitted.

In the embodiment of the present application, the Wi-Fi protocol stack is modified by forcibly setting the P2P mode to the group mode in which an SSID and a password can be set as desirable to the user so that the mobile device which is a relay device can be scanned and identified by an external electronic device using the SSID, and communication can be secured using the password.

The P2P_GROUP_ADD instruction can be extended in the Wi-Fi protocol stack Wpa_supplicant of the system:
wpas_p2p_group_add_with_ssid(wpa_s, 1, freq, ht40, ssid, passphrase, ssid_len, passphrase_len)

Where freq represents the second channel, ssid_len represents the first length, passphrase represents the password, and passphrase_len represents the second length.

The channel, the SSID, the password, and the other parameters can be sent in the extended P2P group function.

After the relay instruction is sent, the mobile device which is a relay device sends a broadcast frame carrying the SSID, and the other electronic device can scan and locate the relay device and then access to the relay device using the SSID and the password.

In the embodiment of the present application, the external wireless access point is accessed through the station node inbuilt in the mobile device for communication, and the external electronic device accesses to the inbuilt P2P node for communication, to thereby enable the relay function in the mobile device; and since the mobile device has been widely popularized, the existing mobile device can be reused as a relay to thereby avoid additional hardware from being configured, so as to greatly lower the cost, and also since no fixed power source receptacle is required to power the mobile device, the well-portable mobile device can be adjusted in position to the strength of the signal to thereby greatly enhance the relayed wireless signal. Moreover the first channel of the wireless access point, and the second channel of the P2P node inbuilt in the mobile device do not interfere with each other, thus improving the data forwarding capacity of the relay function, and the relay performance thereof.

In an embodiment of the present application, the method according to the present application can further include the following steps:

In the step 105, a packet forwarding function is enabled so that a data packet is forwarded between the different nodes of Wi-Fi inbuilt in the mobile device;

The packet forward function can be enabled using the echo attribute value.

echo 1>/proc/sys/net/ipv4/ip_forward

Packet forwarding refers to forwarding a packet from one device to another device.

In the embodiment of the present application, the packet forwarding function can be enabled to forward a data packet between the station node and the P2P node of Wi-Fi inbuilt in the mobile device.

In the step 106, configuration information of packet forwarding is sent to the inbuilt Wi-Fi module so that a data packet is forwarded between the inbuilt station node and the inbuilt P2P node.

In an embodiment of the present application, the address table service iptables of the system can be invoked to send a routing table to the Wi-Fi module, where the routing table includes a route between a first IP address of the P2P node, and a second IP address of the station node; and The address table service iptables of the system can be invoked to send configuration information of the Network Address Translation (NAT) function to the Wi-Fi module, where the source IP address and the destination IP address of the IP packet are modified automatically by the NAT function to translate the first IP address of the P2P node.

Of course a prior routing table can be further removed before the routing table and the NAT function are sent.

The configuration information of iptables and NAT is as follows:

```
#remove old rules (The prior routing table is removed)
iptables -F
iptables -t filter -F
iptables -t nat -F
# Bring up NAT rules
iptables -t nat -A POSTROUTING -s 192.168.49.0/24 -d 0.0.0.0/0 -j MASQUERADE
```

Particularly if the IP segment of the relay device (i.e., the mobile device) is 192.168.49.0, then "Bring up NAT rules" can be sent to re-encapsulate and de-encapsulate the data packet with the source address being the network segment of 192.168.49.0/24 by translating the source address into 0.0.0.0/0, and to forward the data packet to the station.

In the step 107, configuration information of a Domain Name System (DNS) is sent to the Wi-Fi module so that the data packet received by the P2P node is forwarded.

The address table service iptables in the system can be invoked to send the address of a gateway of the DNS in the Transport Control Protocol (TCP) to the Wi-Fi module;

The command format is:

```
iptables -t nat -I PREROUTING -i (the name of the relay device) -p tcp --dport
53 -j DNAT --to-destination (the router gateway)
```

Alternatively the address table service iptables in the system can be invoked to send the address of the gateway of the DNS in the open system internet protocol User Datagram Protocol (UDP) to the Wi-Fi module;

The command format is:

```
iptables -t nat -I PREROUTING -i (the name of the relay device) -p udp
--dport 53 -j DNAT --to-destination (the router gateway)
```

As described above, the DNS gateway addresses in the TCP and the UDP are configured to the relay device (i.e., the mobile device), and after the DNS is configured, the input IP address will be parsed by the DNS server for communication over the network.

Figure 5:
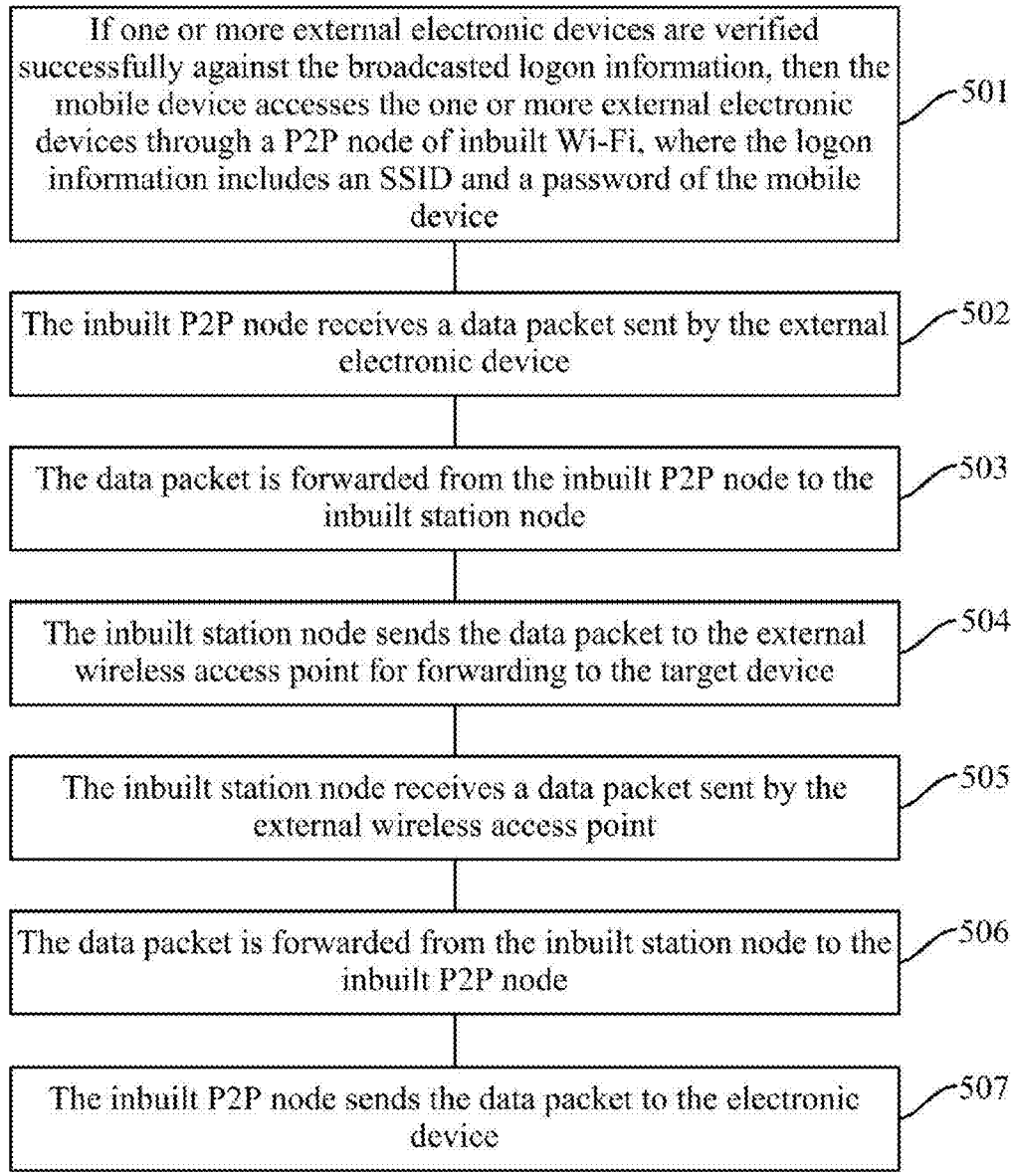
FIG. 5 is a flow chart of a process of an embodiment of a method for relaying by a mobile device according to the present application.

Referring to FIG. 5, there is illustrated a flow chart of a process of an embodiment of a method for relaying by a mobile device according to the present application In the step 501, if one or more external electronic devices are verified successfully against the broadcasted logon information, then the mobile device accesses the one or more external electronic devices through a P2P node of inbuilt Wi-Fi, where the logon information includes an SSID and a password of the mobile device;

The relay device (i.e., the mobile device) can be regarded as a wireless access point to broadcast a beacon frame periodically so that another scanning station device locating the beacon frame can be provided with the SSID of the relay device (i.e., the mobile device).

If a request sent by the one or more external electronic devices for the service set identifier in the logon information is received by the mobile device, then a response message of Challenge Text is returned to the one or more external electronic devices;

If a connection request sent by the one or more external electronic devices is received, then a password in the connection request is verified for consistency with the password in the logon information according to a second length of the password in the logon information; and If the passwords are consistent, then the one or more external electronic devices access the mobile terminal, e.g., electronic devices of Station 1, Station 2, and Station 3 as illustrated in FIG. 2.

In the step 502, the inbuilt P2P node receives a data packet sent by the external electronic device.

If the connected electronic device communicates with the external target device, then the electronic device will send the data packet to the relay device (i.e. the mobile device).

In the step 503, the data packet is forwarded from the inbuilt P2P node to the inbuilt station node;

It is determined whether a source address of the data packet is a first IP address of the inbuilt P2P node, e.g., 192.168.49.0, and if so, then the first IP address is translated into a destination IP address of 0.0.0.0 based upon configuration information of NAT; and A routing table is searched for a second IP address corresponding to the first IP address, and since a packet forwarding function is enabled in advance, the translated data packet with the destination IP address is forwarded to the station node at the second IP address.

In the step 504, the inbuilt station node sends the data packet to the external wireless access point for forwarding to the target device;

In a real application, the data packet includes Uniform Resource Locator (URL) information, and the wireless access point maps the URL information to an IP address through a Domain Name System (DNS), and forwards the data packet to the target device at the IP address, e.g., a web server, through the base station illustrated in FIG. 2.

It shall be noted that the inbuilt station node operates over a first channel, and the inbuilt P2P node operates over a second channel, thus avoiding interference to each other.

In the step 505, the inbuilt station node receives a data packet sent by the external wireless access point.

If the external target device communicates with the external electronic device connected therewith, then the target device will send the data packet to the relay device (i.e., the mobile device), through the base station.

In the step 506, the data packet is forwarded from the inbuilt station node to the inbuilt P2P node;

If a second IP address of the station node from which the data packet originates is determined, and the routing table is searched for a first IP address corresponding to the second IP address, then the data packet can be forwarded to the P2P node at the first IP address.

In the step 507, the inbuilt P2P node sends the data packet to the electronic device.

The relay device (i.e., the mobile terminal) sends the data packet of the external target device to the accessing external electronic device through the P2P node to thereby relay the data packet.

It shall be noted that the station node operates over the first channel, and the P2P node operates over the second channel, thus avoiding interference to each other.

It shall be noted that for the sake of a concise description, the embodiments of the method have been described as a series of actions in combination, but those skilled in the art shall appreciate that the embodiment of the present application will not be limited to the described order of the actions because some of the steps may be performed in another order or concurrently dependent upon the embodiments of the present application. Secondly those skilled in the art shall also appreciate that all the embodiments described here are preferred embodiments, but all the actions involved in the embodiments may not necessarily be necessary to the embodiments of the present application.

Figure 6:
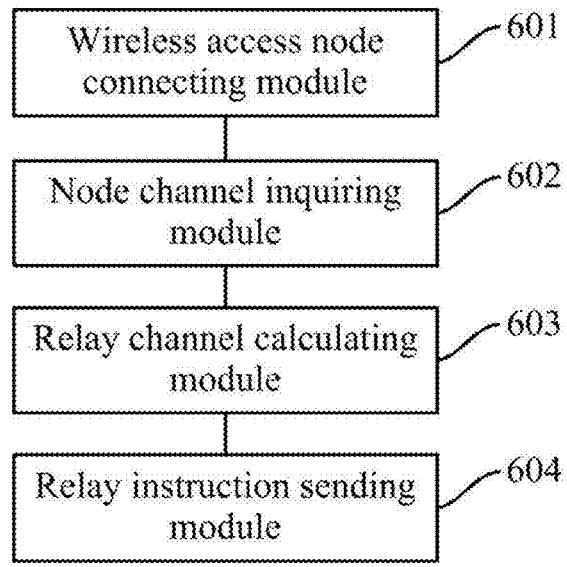
FIG. 6 is a structural block diagram of an embodiment of an apparatus for configuring a relay channel of a mobile device according to the present application.

Referring to FIG. 6, there is illustrated a structural block diagram of an embodiment of an apparatus for configuring a relay channel of a mobile device according to the present application, applicable to the mobile device, where the apparatus can particularly include the following modules:

A wireless access node connecting module 601 is configured to access to an external wireless access point through a station node of Wi-Fi inbuilt in the mobile device;

A node channel inquiring module 602 is configured to inquire about a first channel over which the wireless access point operates;

A relay channel calculating module 603 is configured to calculate a second channel without interference from and to the first channel; and A relay instruction sending module 604 is configured to send a relay instruction to an inbuilt Wi-Fi module through a P2P node of Wi-Fi inbuilt in the mobile device so that logon information of the mobile device is broadcasted over the second channel, and one or more external electronic devices access to the mobile device through the inbuilt P2P node over the second channel.

In an embodiment of the present application, the relay channel calculating module 603 can include the following sub-modules:

A channel type inquiring sub-module is configured to inquire about a band type of the first channel; and A channel calculating sub-module is configured to calculate the second channel without interference from and to the first channel according to the band type.

In an embodiment of the present application, the channel calculating sub-module can include the following unit:

A channel shifting unit is configured, if the band type is the 2.4G band, to set the second channel as the first channel shifted by at least 5 channels.

In an embodiment of the present application, the channel shifting unit can include the following sub-units:

A first setting sub-unit is configured, if the serial number of the first channel is more than or equal to a preset first serial number, to set the second channel to a channel with the lowest serial number in the 2.4G band, where the channel with the lowest serial number is spaced from the channel with the first number by at least 6 channels; and A second setting sub-unit is configured, if the serial number of the first channel is less than the preset first serial number, to set the second channel to a channel with the highest serial number in the 2.4G band, where the channel with the highest serial number is spaced from the channel with the first number by at least 7 channels.

In an embodiment of the present application, the channel calculating sub-module can include the following unit:

A channel setting unit is configured, if the band type is the 5G band, to set the second channel to another channel than the first channel.

In an embodiment of the present application, the channel setting unit can include the following sub-units:

A channel serial number determining sub-unit is configured to determine whether the serial number of the first channel is less than or equal to a preset second serial number; and if so, to invoke a third setting sub-unit; otherwise, to invoke a fourth setting sub-unit;

The third setting sub-unit is configured to set the second channel to a channel with the highest serial number in the 5G band, where the channel with the highest serial number is spaced from the channel with the second number by at least 8 channels; and The fourth setting sub-unit is configured to set the second channel to a channel with the lowest serial number in the 5G band, where the channel with the lowest serial number is spaced from the channel with the second number by at least 9 channels.

In an embodiment of the present application, the apparatus can further include the following modules:

A packet forward enabling module is configured to enable a packet forward function so that a data packet is forwarded between the different nodes of Wi-Fi inbuilt in the mobile device; and A packet forward configuring module is configured to send configuration information of packet forwarding to the inbuilt Wi-Fi module so that a data packet is forwarded between the inbuilt station node and the inbuilt P2P node.

Since the embodiments of the apparatus are substantially similar to the embodiments of the method, the embodiments of the apparatus have been described in brief, and reference can be made to the description of the embodiments of the method for details of the embodiments of the apparatus.

Figure 7:
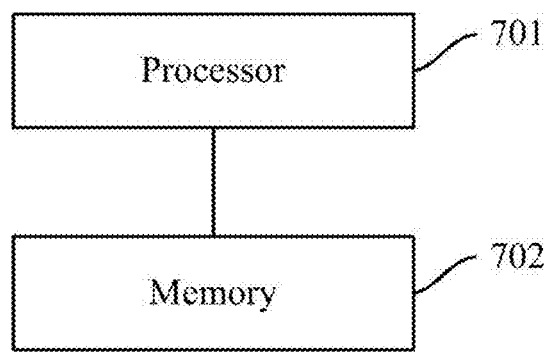
FIG. 7 is a structural block diagram of an embodiment of an apparatus for configuring a relay channel of a mobile device according to the present application.

Based upon the same inventive idea, an embodiment of the present application further provides an apparatus for configuring a relay channel of a mobile device, applicable to the mobile device. Referring to FIG. 7, there is illustrated a structural block diagram of an embodiment of an apparatus for configuring a relay channel of a mobile device, applicable to the mobile device according to the present application, applicable to the mobile device, where the apparatus can include:

A processor 701; and

A memory 702 storing at least one instruction configured to be executed by the processor 701: to access to an external wireless access point through a station node of Wi-Fi inbuilt in the mobile device; to inquire about a first channel over which the wireless access point operates; to calculate a second channel without interference from and to the first channel; and to send a relay instruction to an inbuilt Wi-Fi module through a P2P node of Wi-Fi inbuilt in the mobile device so that logon information of the mobile device is broadcasted over the second channel, and one or more external electronic devices access to the mobile device through the P2P node over the second channel.

Where the at least one instruction configured to be executed by the processor 701 to calculate the second channel without interference from and to the first channel is configured: inquire about a band type of the first channel; and to calculate the second channel without interference from and to the first channel according to the band type. and where the at least one instruction configured to be executed by the processor 701 to calculate the second channel without interference from and to the first channel according to the band type is configured, if the band type is the 2.4G band, to set the second channel as the first channel shifted by at least 5 channels. Where the at least one instruction configured to be executed by the processor 701 to set the second channel as the first channel shifted by at least 5 channels is configured: if the serial number of the first channel is more than or equal to a preset first serial number, to set the second channel to a channel with the lowest serial number in the 2.4G band, where the channel with the lowest serial number is spaced from the channel with the first number by at least 6 channels; and if the serial number of the first channel is less than the preset first serial number, to set the second channel to a channel with the highest serial number in the 2.4G band, where the channel with the highest serial number is spaced from the channel with the first number by at least 7 channels.

Where the at least one instruction configured to be executed by the processor 701 to calculate the second channel without interference from and to the first channel according to the band type is configure, if the band type is the 5G band, to set the second channel to another channel than the first channel. Where the at least one instruction configured to be executed by the processor 701 to set the second channel to the other channel than the first channel is configured: to determine whether the serial number of the first channel is less than or equal to a preset second serial number; and if so, to set the second channel to a channel with the highest serial number in the 5G band, where the channel with the highest serial number is spaced from the channel with the second number by at least 8 channels; otherwise, to set the second channel to a channel with the lowest serial number in the 5G band, where the channel with the lowest serial number is spaced from the channel with the second number by at least 9 channels.

Furthermore the at least one instruction is further configured to be executed by the processor 701: to enable a packet forward function so that a data packet is forwarded between the different nodes of Wi-Fi inbuilt in the mobile device; and to send configuration information of packet forwarding to the inbuilt Wi-Fi module so that a data packet is forwarded between the inbuilt station node and the inbuilt P2P node.

Figure 8:
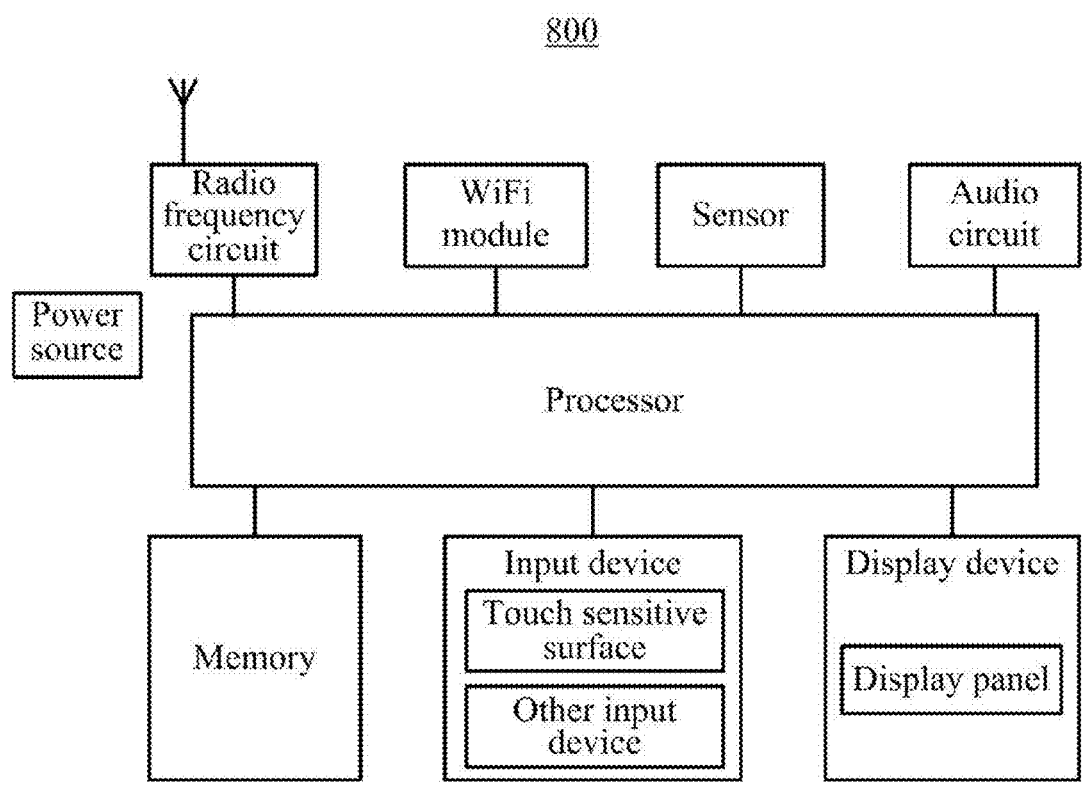
FIG. 8 is a structural block diagram of a mobile terminal, to which the apparatus as illustrated in FIG. 7 is applied, according to the present application.

As illustrated in FIG. 8, a terminal 800 to which the apparatus as illustrated in FIG. 7 is applied can be any one of various handheld devices (e.g., a handset, a tablet computer, a PDA, a smart wearable device, etc.), and can include a processor including one or more processing cores, a radio frequency circuit, a memory including one or more computer readable storage mediums, an input device, a display device, a sensor, an audio circuit, a power source, and other components, where the processor can be the processor 701 as illustrated in FIG. 7, or a processor performing at least the function of the processor 701 as illustrated in FIG. 7, and the memory can be the memory 702 as illustrated in FIG. 7, or a memory performing at least the function of the memory 702 as illustrated in FIG. 7. Those skilled in the art can appreciate that the terminal 800 in this embodiment will not be limited to the structure as illustrated, but can include more or less components or some of the components can be combined or different components can be arranged, where:

The radio frequency circuit can be configured to receive and transmit a signal in receiving and transmitting information or in communication, and particularly to receive and then pass downlink information of a base station to the one or more processors for processing; and to send uplink data to the base station. Typically the radio frequency circuit includes but will not be limited to an antenna, at least one amplifier, a tuner, one or more oscillators, a Subscriber Identifier Module (SIM) card, a transducer, a coupler, a Low Noise Amplifier (LNA), a duplexer, etc. Moreover the radio frequency circuit can further communicate wirelessly with a network and another device in any one of communication standards or protocols including but not limited to a Global System of Mobile communication (GSM), a General Packet Radio Service (GPRS), a Code Division Multiple Access (CDMA), a Wideband Code Division Multiple Access (WCDMA), a Long Term Evolution (LTE), an e-mail, a Short Messaging Service (SMS), etc.

The memory can be configured to store software programs and modules, and the processor is configured to run the software programs and modules stored in the memory to thereby perform various function present applications and data processing. The memory can generally include a program storage area and a data storage area, where an operating system, present applications required for at least one function (e.g., an audio playing function, an image playing function, etc.), etc., can be stored in the program storage area; and data created for use of the terminal 800 (e.g., audio data, an address book, etc.), etc., can be stored in the data storage area. Moreover the memory can include a high-speed random access memory, and can further include a nonvolatile memory, e.g., at least one magnetic disks memory device, a flash memory device or another volatile solid memory device. Correspondingly the memory can further include a memory controller configured to provide an access of the processor and the input device to the memory.

The input device can be configured to receive input digital or character information and to generate a keyboard, mouse, joystick, optical or track ball signal input related to user setting and function control. The input device can include a touch sensitive surface and another input device. The touch surface, also referred to as a touch display screen or a touch control panel, can collect a touch operation by a user thereon or in proximity thereto (e.g., an operation by the user using a finger, a touch pen or any other appropriate object or attachment on or in proximity to the touch sensitive surface) and drive a corresponding connected device by a preset program. Optionally the touch sensitive surface can include two components of a touch detection device and a touch controller, where the touch detection device detects the position of touching by the user, and detects a signal as a result of the touch operation and transfers the signal to the touch controller; and the touch controller receives the touch signal from the touch detection device, and converts it into coordinates of a touch point and further transfers them to the processor, and can receive and execute a command sent by the processor. Moreover the touch sensitive surface can be embodied in various types of resistive, capacitive, infrared, surface sound wave and other types. The input device can further include another input device in addition to the touch sensitive surface. Particularly the other input device can include but will not be limited to one or more of a physical keyboard, functional keys (e.g., volume control buttons, a power button, etc.), a track ball, a mouse, a joystick, etc.

The display unit can be configured to display information entered by the user or information provided to the user and various graphic user interfaces of the terminal 800, where these graphic user interfaces can be composed of graphics, texts, icons, videos or any combination thereof. The display unit can include a display panel, and optionally the display panel can be configured in the form of a Liquid Crystal Display (LCD), an Organic Light-Emitting Diode (OLED) display, etc. Furthermore the touch sensitive surface can overlie the display panel, and the touch sensitive surface detecting the touch operation thereon or in proximity thereto transfers it to the processor to determine the type of the touch event, and thereafter the processor provides a corresponding visual output on the display panel according to the type of the touch event. Although the touch sensitive surface and the display panel are embodied in this embodiment as two separate components to perform the input and output functions, the touch sensitive surface and the display panel can be integrated to perform the input and output functions in some embodiments.

The terminal 800 can further include at least one sensor, e.g., an optical sensor, a motion sensor and other sensors. The optical sensor can include an ambient optical sensor and a proximity sensor, where the ambient optical sensor can adjust the brightness of the display panel according to the illumination of ambient light rays, and the proximity sensor can disable the display panel and/or a backlight when the terminal 800 moves in proximity to an ear. A gravity acceleration sensor which is a motion sensor can detect the magnitudes of accelerations in respective directions (typically three axes), and can detect the magnitude and the direction of gravity when the sensor is stationary and can be configured to perform present applications of identifying the posture of a handset (e.g., switching between landscape and portrait modes, relevant games, calibration of the posture of a magnetometer, etc.), a relevant function of identifying vibration (e.g., a pedometer, a knock, etc.), etc.; and the terminal 800 can be further configured with a gyroscope, a barometer, a hygrometer, a thermometer, an infrared sensor and other sensors, and a repeated description of these components will be omitted here.

The audio circuit, a speaker and a transducer can provide an audio interface between the user and the terminal 800. The audio circuit can receive and convert audio data into an electric signal and transmit the electric signal to the speaker, which is converted by the speaker into an audio signal for output; and on the other hand, the transducer converts a collected audio signal into an electric signal which is received by the audio circuit and then converted into audio data, and the audio data is further output to the processor for processing and then transmitted by the radio frequency circuit to another device, for example, or the audio data is output to the memory for further processing. The audio circuit may further include an earphone jack for communication between an external earphone and the terminal.

The processor is a control center of the terminal 800, has the respective components connected by various interfaces and lines, and runs or executes the software programs and/or modules stored in the memory and invokes the data stored in the memory to perform the various functions of the terminal 800 and process the data to thereby manage and control the terminal 800 as a whole. Optionally the processor can include one or more processing cores; and preferably the processor can be integrated with a present application processor and a modem processor, where the present application processor generally handles the operating system, the user interfaces, the present applications, etc., and the modem processor generally handles wireless communication. As can be appreciated, the modem processor may not be integrated into the processor.

The terminal 800 further includes a power source (e.g., a battery) powering the respective components, and preferably the power source can be logically connected with the processor through a power management system to thereby perform charging and discharging management, power consumption management, and other functions through the power management system. The power source can further include one or more DC or AC power sources, recharging systems, power source failure detection circuits, power source transformers or inverters, power source status indicators, and other any appropriate components.

Although not illustrated, the terminal 800 can further include a camera, a Bluetooth module, etc., and a repeated description thereof will be omitted here. Particularly in this embodiment, the display device of the terminal 800 is a touch screen display, and the terminal 800 further includes a memory in which one or more programs are stored and configured to be executed by the one or more processors.

The respective embodiments in the description have been described progressively, and each of the embodiments has been focused on its differences from the other embodiments, and the description of their commonalties can be applied to each other.

Those skilled in the art shall appreciate that the embodiments of the present application can be embodied as a method, a system or a computer program product. Therefore the present application can be embodied in the form of an all-hardware embodiment, an all-software embodiment or an embodiment of software and hardware in combination. Furthermore the present application can be embodied in the form of a computer program product embodied in one or more computer useable storage mediums (including but not limited to a disk memory, a CD-ROM, an optical memory, etc.) in which computer useable program codes are contained.

The present application has been described in a flow chart and/or a block diagram of the method, the device (system) and the computer program product according to the embodiments of the present application. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

It shall be further noted that such relationship terms in this context as first and second, etc., are merely intended to distinguish one entity or operation from another entity or operation but not necessarily intended to require or suggest any such a real relationship or order between these entities or operations. Furthermore the terms "include", "comprise" and any variants thereof are intended to encompass nonexclusive inclusion so that a process, a method, an article or a device including a series of elements includes both those elements and one or more other elements which are not listed explicitly or one or more elements inherent to the process, the method, the article or the device. Unless stated otherwise, an element being defined in the sentence "include/comprise a(n) . . . " will not exclude the presence of one or more additional identical element in the process, the method, the article or the device including the element.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A mobile terminal comprising a processor and a memory storing at least one instruction, the processor configured to execute the at least one instruction to:
   access an external wireless access point through a station node of a wireless local area network (WLAN) inbuilt in the mobile terminal;
   inquire about a band type of a first channel over which the wireless access point operates;
   send a relay instruction to an inbuilt WLAN module through a Peer-to-Peer (P2P) node of the WLAN inbuilt in the mobile terminal, so that logon information of the mobile terminal is broadcasted over a second channel and one or more external electronic devices access to the mobile terminal is through the P2P node over the second channel;
   if the band type of the first channel is a 2.4G band, set the second channel, without interference from and to the first channel, as the first channel shifted by at least 5 channels;
   if a serial number of the first channel is more than or equal to a preset serial number, set the second channel to a channel with the lowest serial number in the 2.4G band, wherein the channel with the lowest serial number is spaced from the channel with a first number by at least 6 channels; and
   if the serial number of the first channel is less than the preset serial number, set the second channel to a channel with the highest serial number in the 2.4G band, wherein the channel with the highest serial number is spaced from the channel with a first number by at least 7 channels.

2. A mobile terminal comprising a processor, and a memory storing at least one instruction, the processor configured to execute the at least one instruction to:
   access an external wireless access point through a station node of an WLAN inbuilt in the mobile terminal;
   inquire about a band type of a first channel over which the wireless access point operates;
   send a relay instruction to an inbuilt WLAN module through a P2P node of the WLAN inbuilt in the mobile terminal, so that logon information of the mobile terminal is broadcast over a second channel and one or more external electronic devices access to the mobile terminal is through the P2P node over the second channel;
if the band type of the first channel is a 5G band, set the second channel, without interference from and to the first channel, to another channel other than the first channel; and
determine whether a serial number of the first channel is less than or equal to a preset serial number, if so, said another channel is a second channel to a channel with the highest serial number in the 5G band, wherein the channel with the highest serial number is spaced from the channel with the second number by at least 8 channels, otherwise, said another channel is a channel with the lowest serial number in the 5G band, wherein the channel with the lowest serial number is spaced from the channel with the second number by at least 9 channels.

3. The mobile terminal according to claim 2, wherein the processor is further configured to execute the at least one instruction to:
enable a packet forward function so that a data packet is forwarded between different nodes of the WLAN inbuilt in the mobile terminal; and
send configuration information of packet forwarding to the inbuilt WLAN module so that a data packet is forwarded between the station node and the P2P node.

4. The mobile terminal according to claim 1, wherein the processor is further configured to execute the at least one instruction to:
enable a packet forward function so that a data packet is forwarded between different nodes of the WLAN inbuilt in the mobile terminal; and
send configuration information of packet forwarding to the inbuilt WLAN module so that a data packet is forwarded between the station node and the P2P node.

5. A method for configuring a relay channel of a mobile terminal, the method comprising:
accessing, by the mobile terminal, an external wireless access point through a station node of an WLAN inbuilt in the mobile terminal;
inquiring, by the mobile terminal, about a band type of a first channel over which the wireless access point operates;
calculating, by the mobile terminal, a second channel without interference from and to the first channel including setting the second channel as the first channel shifted by at least 5 channels if the band type is a 2.4G band; and
sending, by a P2P node of the WLAN inbuilt in the mobile terminal, a relay instruction to an WLAN module inbuilt in the mobile terminal, so that logon information of the mobile terminal is broadcasted over the second channel and one or more external electronic devices access to the mobile terminal is through the P2P node over the second channel,
wherein setting the second channel comprises:
if a serial number of the first channel is more than or equal to a preset serial number, setting the second channel to a channel with the lowest serial number in the 2.4G band, wherein the channel with the lowest serial number is spaced from the channel with the first number by at least 6 channels; and
if the serial number of the first channel is less than the preset serial number, setting the second channel to a channel with the highest serial number in the 2.4G band, wherein the channel with the highest serial number is spaced from the channel with the first number by at least 7 channels.

6. The method according to claim 5, further comprising:
enabling a packet forward function so that a data packet is forwarded between different nodes of the WLAN inbuilt in the mobile terminal; and
sending configuration information of packet forwarding to the inbuilt WLAN module so that a data packet is forwarded between the inbuilt station node and the P2P node.

7. A method for configuring a relay channel of a mobile terminal, the method comprising:
accessing, by the mobile terminal, an external wireless access point through a station node of an WLAN inbuilt in the mobile terminal;
inquiring, by the mobile terminal, about a band type of a first channel over which the wireless access point operates;
calculating, by the mobile terminal, a second channel without interference from and to the first channel including setting the second channel to another channel other than the first channel if the band type is a 5G band; and
sending, by a P2P node of the WLAN inbuilt in the mobile terminal, a relay instruction to an WLAN module inbuilt in the mobile terminal, so that logon information of the mobile terminal is broadcasted over the second channel and one or more external electronic devices access to the mobile terminal is through the P2P node over the second channel,
wherein setting the second channel comprises determining whether a serial number of the first channel is less than or equal to a preset serial number, if so, said another channel is a channel with the highest serial number in the 5G band, wherein the channel with the highest serial number is spaced from the channel with the second number by at least 8 channels, otherwise, said another channel is a channel with the lowest serial number in the 5G band, wherein the channel with the lowest serial number is spaced from the channel with the second number by at least 9 channels.

8. The method according to claim 7, further comprising:
enabling a packet forward function so that a data packet is forwarded between different nodes of the WLAN inbuilt in the mobile terminal; and
sending configuration information of packet forwarding to the inbuilt WLAN module so that a data packet is forwarded between the station node and the P2P node.

* * * * *